(12) United States Patent
Levy et al.

(10) Patent No.: US 11,308,522 B2
(45) Date of Patent: Apr. 19, 2022

(54) UTILIZING BROWSING HISTORY WHILE PRESERVING USER-PRIVACY

(71) Applicant: Anagog LTD., Tel Aviv (IL)

(72) Inventors: Gil Levy, Ramot Meir (IL); Yaron Aizenbud, Haifa (IL)

(73) Assignee: ANAGOG LTD., Tel Aviv (IL)

( * ) Notice: Subject to any disclaimer, the term of this patent is extended or adjusted under 35 U.S.C. 154(b) by 210 days.

(21) Appl. No.: 16/711,774

(22) Filed: Dec. 12, 2019

(65) Prior Publication Data

US 2020/0193484 A1     Jun. 18, 2020

Related U.S. Application Data

(60) Provisional application No. 62/779,880, filed on Dec. 14, 2018.

(51) Int. Cl.
| | |
|---|---|
| *G06F 17/10* | (2006.01) |
| *G06Q 30/02* | (2012.01) |
| *G06F 16/958* | (2019.01) |
| *G06F 16/955* | (2019.01) |

(52) U.S. Cl.
CPC ..... *G06Q 30/0269* (2013.01); *G06F 16/9566* (2019.01); *G06F 16/972* (2019.01)

(58) Field of Classification Search
CPC ............ G06Q 30/0269; G06F 16/9566; G06F 16/972
See application file for complete search history.

(56) References Cited

U.S. PATENT DOCUMENTS

| | | | | |
|---|---|---|---|---|
| 5,903,732 A | * | 5/1999 | Reed | H04L 67/02 709/229 |
| 8,161,184 B2 | * | 4/2012 | Sekar | H04L 61/1511 370/314 |
| 8,706,910 B2 | * | 4/2014 | Taylor | H04L 67/02 709/246 |
| 10,115,124 B1 | * | 10/2018 | Kamvysselis | G06Q 30/0244 |
| 2001/0016906 A1 | * | 8/2001 | Brebner | G06F 16/972 713/150 |
| 2001/0049620 A1 | * | 12/2001 | Blasko | G06Q 30/0207 705/14.1 |
| 2002/0087975 A1 | * | 7/2002 | Schlack | H04N 21/26233 725/35 |
| 2002/0128925 A1 | * | 9/2002 | Angeles | G06Q 40/12 714/E11.193 |

(Continued)

*Primary Examiner* — Shahid K Khan
(74) *Attorney, Agent, or Firm* — Myers Wolin, LLC (57) ABSTRACT

A method, system and product to be implemented at a server, including receiving from a user device a request associated with obtaining a web resource; handling the request, wherein, based on the handling, the web resource is obtained and provided to the user device; and transmitting an indication of the request to a predetermined port of the user device. Another method, system and product to be implemented at a user device, includes transmitting from a software product a plurality of requests of web resources; receiving by a software agent a plurality of indications of the plurality of requests via a predetermined port of the user device; and performing by the software agent an analysis of the plurality of requests of web resources, thereby determining for a user of the user device one or more user parameters associated with a personalized profile of the user.

20 Claims, 6 Drawing Sheets

(56) References Cited

U.S. PATENT DOCUMENTS

| | | | | |
|---|---|---|---|---|
| 2002/0161828 | A1* | 10/2002 | Edison | H04L 67/34 719/315 |
| 2003/0204756 | A1* | 10/2003 | Ransom | H02J 13/00017 713/300 |
| 2004/0003131 | A1* | 1/2004 | Curtis | G06F 8/61 719/318 |
| 2008/0072249 | A1* | 3/2008 | Hovnanian | G06Q 30/02 348/E7.071 |
| 2010/0043071 | A1* | 2/2010 | Wang | G06F 21/51 726/22 |
| 2010/0220846 | A1* | 9/2010 | Gisby | H04M 3/38 379/202.01 |
| 2012/0023127 | A1* | 1/2012 | Kirshenbaum | G06Q 30/0201 707/769 |
| 2012/0078708 | A1* | 3/2012 | Taylor | G06Q 30/0242 709/224 |
| 2012/0290724 | A1* | 11/2012 | Noro | H04L 67/2814 709/225 |
| 2013/0231043 | A1* | 9/2013 | Tawfiq Moshtaha | H04W 4/90 455/3.01 |
| 2014/0047544 | A1* | 2/2014 | Jakobsson | G06F 21/566 726/23 |
| 2015/0143504 | A1* | 5/2015 | Desai | H04L 63/0245 709/224 |
| 2016/0104203 | A1* | 4/2016 | Roosenraad | H04L 65/4084 705/14.66 |
| 2019/0130100 | A1* | 5/2019 | Dymshits | G06F 16/90335 |

* cited by examiner

UTILIZING BROWSING HISTORY WHILE PRESERVING USER-PRIVACY

CROSS-REFERENCE TO RELATED APPLICATION

This application claims the benefit of provisional patent application No. 62/779,880 filed Dec. 14, 2018, which is hereby incorporated by reference in its entirety without giving rise to disavowment.

TECHNICAL FIELD

The present disclosure relates to user profiling in general, and to systems, products, and methods for accumulating and utilizing browsing data, in particular.

BACKGROUND

Knowing to which Uniform Resource Locators (URLs) users are browsing may be useful for users profiling. Such profiling may be used for e-marketing or for focused advertising systems such as Google AdSense™.

URL-based profiling may also be referred to as cookie profiling. Some websites save Hypertext Transfer Protocol (HTTP) cookies on the users' devices. Cookies keep track of a user's activity even when the user is not browsing the site that saved the cookie. The data may include web sites in which the user is browsing, phrases that user searched for, or the like.

BRIEF SUMMARY

One exemplary embodiment of the disclosed subject matter is a method to be performed at a server, the method comprising: receiving from a user device a request, wherein the request is associated with obtaining a web resource; handling the request, wherein, based on the handling, the web resource is obtained and provided to the user device; and transmitting an indication of the request to a predetermined port of the user device.

Optionally, the method comprises determining whether or not the user device is configured to receive the indication, and upon determining that the user device is configured to receive the indication, transmitting the indication.

Optionally, the method comprises receiving from the user device a signal indicating that the user device is configured to receive the indication; and in response to the signal, transmitting the indication.

Optionally, the method comprises avoiding from transmitting the indication in an absence of receiving the signal within a timeframe.

Optionally, the request comprises a Uniform Resource Locator (URL), and the indication comprises at least one of the group consisting of: the URL, an Internet Protocol (IP) address of the URL, a domain name within the URL, and a query portion within the URL.

Optionally, the request comprises a URL, and the URL is analyzed to determine a domain name within the URL, wherein the indication comprises the domain name.

Optionally, the request comprises a URL, and the URL is analyzed to determine a query portion within the URL, wherein the indication comprises the query portion.

Optionally, the request is issued by a browser that is executed on the user device, wherein the user device executes a software agent listening on the predetermined port, wherein the software agent is independent of the browser.

Optionally, the server comprises a gateway server, the request comprises an IP address, and the IP address is forwarded to a network node to obtain a web page associated with the IP address.

Optionally, the server comprises a Domain Name Server (DNS), the request comprises a domain name, and the method comprises querying a database to obtain an IP address of a web server associated with the domain name, and providing the IP address to the user device, thereby enabling the user device to communicate with the web server.

Another exemplary embodiment of the disclosed subject matter is computer program product comprising a non-transitory computer readable storage medium retaining program instructions, which program instructions when read by a processor, cause the processor to perform at a server: receiving from a user device a request, wherein the request is associated with obtaining a web resource; handling the request, wherein, based on the handling, the web resource is obtained and provided to the user device; and transmitting an indication of the request to a predetermined port of the user device.

Yet another exemplary embodiment of the disclosed subject matter is a system at a server, the system comprising a processor and coupled memory, the processor being adapted to perform: receiving from a user device a request, wherein the request is associated with obtaining a web resource; handling the request, wherein, based on the handling, the web resource is obtained and provided to the user device; and transmitting an indication of the request to a predetermined port of the user device.

Yet another exemplary embodiment of the disclosed subject matter is a method to be performed at a user device, the method comprising: transmitting to a server, from a software product that is executed by the user device, a plurality of requests of web resources; receiving from the server, by a software agent, a plurality of indications of the plurality of requests of web resources via a predetermined port of the user device, wherein the software product is not configured to provide information to the software agent; performing, by the software agent, an analysis of the plurality of requests of web resources indicated, thereby determining for a user of the user device one or more user parameters associated with a personalized profile of the user; and performing an action based on the personalized profile of the user.

Optionally, the action comprises selecting content items to be served to the user based on the personalized profile of the user.

Optionally, the software agent is configured to send a signal to the server, whereby indicating to the server to send the plurality of indications to the user device via the predetermined port.

Optionally, the server is configured to avoid transmitting the plurality of indications in an absence of receiving the signal within a timeframe.

Optionally, the software agent is configured to monitor the predetermined port, wherein the software agent is independent of the software product.

Optionally, the software product comprises a browsing agent or a web-based application, wherein the software agent is independent of the browsing agent or the web-based application.

Another exemplary embodiment of the disclosed subject matter is computer program product comprising a non-transitory computer readable storage medium retaining program instructions, which program instructions when read by a processor, cause the processor to perform at a user device: transmitting to a server, from a software product that is executed by the user device, a plurality of requests of web resources; receiving from the server, by a software agent, a plurality of indications of the plurality of requests of web resources via a predetermined port of the user device, wherein the software product is not configured to provide information to the software agent; performing, by the software agent, an analysis of the plurality of requests of web resources indicated, thereby determining for a user of the user device one or more user parameters associated with a personalized profile of the user; and performing an action based on the personalized profile of the user.

Yet another exemplary embodiment of the disclosed subject matter is a system at a user device, the system comprising a processor and coupled memory, the processor being adapted to perform: transmitting to a server, from a software product that is executed by the user device, a plurality of requests of web resources; receiving from the server, by a software agent, a plurality of indications of the plurality of requests of web resources via a predetermined port of the user device, wherein the software product is not configured to provide information to the software agent; performing, by the software agent, an analysis of the plurality of requests of web resources indicated, thereby determining for a user of the user device one or more user parameters associated with a personalized profile of the user; and performing an action based on the personalized profile of the user.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is utilizing browsing data of a user by third-party stakeholders. In some exemplary embodiments, browsing data may not be visible to third-party stakeholders. Such stakeholders may employ a profiling software that is installed on the device from which the user is browsing. Browsing data may only be visible to the Operating System (OS) and to the browser, but not to other agents installed on the device, which do not have the cooperation of the OS or browser.

Another technical problem dealt with by the disclosed subject matter is utilizing browsing data, e.g., for advertising, while complying with privacy requirements. In some exemplary embodiments, privacy policies may prohibit or significantly hinder the ability of a stakeholder to retain information about users on servers. It may be desired to retain the information locally on each user's device, to preserve the user's privacy and avoid violating privacy laws, regulations, or policies.

One technical solution may be to configure a server to monitor outgoing requests for web resources from a user device, and return such requests, indications thereof, portions thereof, or the like, to the user device. In some exemplary embodiments, a software product such as a browser of the user device may be configured to send to the server one or more requests associated with obtaining one or more web resources. In some exemplary embodiments, the server may receive the requests from one or more devices such as the user device. The server may handle a request, e.g., by obtaining and providing the requested web resource to the user device. In some exemplary embodiments, in addition to providing the web resource to the user device, the server may also transmit, in response to receiving a request, an indication of the request to a predetermined port of the user device. In some cases, the user device may execute an on-device software agent (also referred to as "on-device software" or "software agent") that may be configured to listen on the predetermined port of the user device, e.g., to receive through the predetermined port one or more indications of one or more requests of web resources originating from the same user device. The predetermined port may be continuously monitored by the software agent to detect any indications of requests. In some exemplary embodiments, the browser of the user device may operate independently from the software agent, e.g., without communicating, sharing, or providing information to the software agent.

For example, the user device may transmit, e.g., via a browser of the user device, a request to obtain a web page. The browser of the user device may request the web page from the server. A separate software agent, that may be independent from the browser, may be executed on the same user device, and may be unable to directly receive information about the request from within the user device. Instead of obtaining the information from within the user device, the information may be echoed back to the user device from the server. In addition to handling the request, the server may transmit an indication to the user device about the request that was issued by the user device. The indication may be transmitted to at least one predetermined port of the user device, on which the software agent may be listening. The software agent may detect requests that are returned by the server, e.g., to accumulate a browsing history of a user of the user device.

In some exemplary embodiments, a request for obtaining one or more web resources may comprise a Uniform Resource Locator (URL), an Internet Protocol (IP) address of the URL, a portion thereof, data extracted from the URL, a domain name within the URL, or the like. In some exemplary embodiments, the indication of the request may comprise at least a portion of the request or information determined based on the request. In some cases, the indication of the request may comprise the URL, the domain name within the URL, a query portion within the URL, the IP address of the URL, or the like. For example, the request may comprise a URL, and the indication may comprise a domain name within the URL.

In some exemplary embodiments, the server may comprise a gateway (GW) server of Internet Service Providers (ISP), a Domain Name Server (DNS), or the like. In some exemplary embodiments, a GW server may be configured to send indications regarding requests that were received thereby. Additionally or alternatively, a DNS may be configured to send indications to domain name resolution requests it received. In some exemplary embodiments, the user may be using a Virtual Private Network (VPN) for accessing the Internet. In such cases, the server which handles web resource requests may not be owned by the ISP but rather may be associated with the VPN. In such an embodiment, the VPN's server may send back the web resource requests to the software agent.

In some scenarios, the server may comprise a DNS which may be configured to receive a URL request from the user device and perform domain name resolution thereto. In addition to the DNS expected operation—e.g., converting the URL to an IP address and responding to the request with a resolution indicating the IP address, the server may be configured to send information back to the user device via the predetermined port of the user device. In some exemplary embodiments, the DNS may send an indication of the request, of the URL, or the like. Additionally or alternatively, the DNS may send the IP address of the URL back in the indication of the request. In some exemplary embodiments, the DNS may only receive the domain name of the URL and may not receive the remaining parts of the URL. As an example, the requested URL may be www.example.com/site/?query. The DNS may receive from the device only the domain—"www.example.com", and accordingly may only provide the domain information to the on-device software. In some cases, the DNS may analyze the URL to determine a domain name within the URL, e.g., by extracting the domain name from the URL. In this case, the DNS may generate the indication to comprise the domain name. In some cases, the DNS may analyze the URL to determine a query portion within the URL, e.g., by extracting the query portion from the URL. In this case, the DNS may generate the indication to comprise the query portion. For example, the DNS may receive a URL including a query such as www.example.com/site/?query. In some cases, the DNS may provide the query portion to the on-device software.

In some scenarios, the server may comprise a GW server which may receive an IP address of a URL request from the user device. In some cases, the GW server may fetch the web page associated with the IP address and send to the predetermined port of the user device an indication of the web page, the IP address of the URL, or any other information that may be extracted from the web page.

In some exemplary embodiments, the server may receive URL requests identifying web resources that are being requested from the user device, and send them back to the software agent on the user device to enable the software agent to monitor and accumulate browsing activities of the user. In some exemplary embodiments, the server may send back to the user device the request or a portion based thereon (also referred to as "echoing"). In addition to sending the URL back to the user device, the server may fetch the requested resource (e.g., the web page that the URL is pointing to) from the web and send it to the user's browser or any other web-based application that requested the web resources.

In some exemplary embodiments, the server may receive at least one URL request and analyze an IP address of the device from which the URL request was sent, e.g., to determine a return address for sending an indication of the URL request. In some exemplary embodiments, the server may send back an indication of the request to the user device via at least one predetermined port of the user device, e.g., using the determined IP address.

In some exemplary embodiments, the server may be configured to determine whether or not the user device has an active software agent that is configured to receive indications of URL requests (also referred to as "echo-enabled"). In some cases, such a determination may be based on whether or not the user device is listed on a "whitelist" of the server as a device in which the on-device software is installed. In other cases, such a determination may be based on one or more signals from the user device indicating that the user device is echo-enabled and is configured to receive URL requests. For example, the software agent of the user device may be configured to periodically send a signal such as a heartbeat signal to the server, e.g., to indicate to the server that indications of URL requests are requested to be sent back to one or more ports of a user device upon receiving such requests. Specifically, the signal may indicate that URL requests from the device should be monitored and returned to the predetermined port of the user device. In some cases, the signal may indicate one or more predetermined ports of the user device to where the indications should be sent. In other cases, the one or more predetermined ports of the user device may be identical for all echo-enabled user devices and thus no indication of the ports may be required.

In some exemplary embodiments, the server may receive from the user device the signal, and, in response to receiving the signal, and, upon determining that the user device is indeed echo-enabled, the server may transmit the indication of the request to a predetermined port of the user device. In some exemplary embodiments, the server may echo every URL request that is received from a device determined to be echo-enabled.

In some exemplary embodiments, in parallel to returning the URL request to the user device, or sequentially thereto, the server may forward any received URL request to a network node, e.g., to obtain requested web resources. In some cases, the network node may receive the request, and in response to receiving the request, the network node may obtain the web resource that was required and provide it to the server. In some cases, the user device may obtain the web resource via the server. In a first example, the request for obtaining the web resource may comprise a URL. According to this example, the server may forward the URL to the network node to obtain a web page associated with the URL.

In some exemplary embodiments, the user device may accumulate, e.g., at the software agent, a plurality of indications of a plurality of requests of web resources. In some exemplary embodiments, the accumulated data may be compiled, e.g., by the software agent, to create a personalized profile for a user of the user device that sent the plurality of requests. In some exemplary embodiments, the personalized profile may be generated based on an analysis of the plurality of indicated requests that may include determining a browsing behavior of the user, interests of the user, demographics information, or the like. In some cases, the analysis may output one or more user characteristics and parameters that are associated with the user such as but not limited to the age of user, the gender of the user, the religion of the user, the hobbies of the user, or the like. In some cases, a personalized profile of the user may be generated for advertising purposes. In some exemplary embodiments, based on the personalized profile of the user, one or more actions may be performed, e.g., by third party stakeholders. As an example, the action may include selecting content items to be served to the user based on the personalized profile of the user.

One technical effect of utilizing the disclosed subject matter is building personal and private profiles of users based on the users' browsing history on their smartphones or other devices without risking a leak of personal information. In some exemplary embodiments, the disclosed subject matter may enable stakeholders to obtain a personalized profile of a user while eliminating a need to send any of their personal information to a remote server and complying with strict privacy requirements. Specifically, the personalized profile may be generated without creating a centralized database of personal information of users retained by the owner of the profiling party. In some cases, although personalized profiles that are generated based on personal information may be shared with third-party stakeholders, the personal browsing information may remain in the users' possession under the users' own control and may not be stored anywhere else.

Another technical effect of utilizing the disclosed subject matter is enabling a software agent at a user device to monitor any browsing activity and any other HTTP-based activity of the user device without the cooperation of a web browser that initiates HTTP-based activity, of the OS, or of any other component of the user device.

The disclosed subject matter may provide for one or more technical improvements over any pre-existing technique and any technique that has previously become routine or conventional in the art.

Additional technical problems, solutions, and effects may be apparent to a person of ordinary skill in the art in view of the present disclosure.

Figure 1:
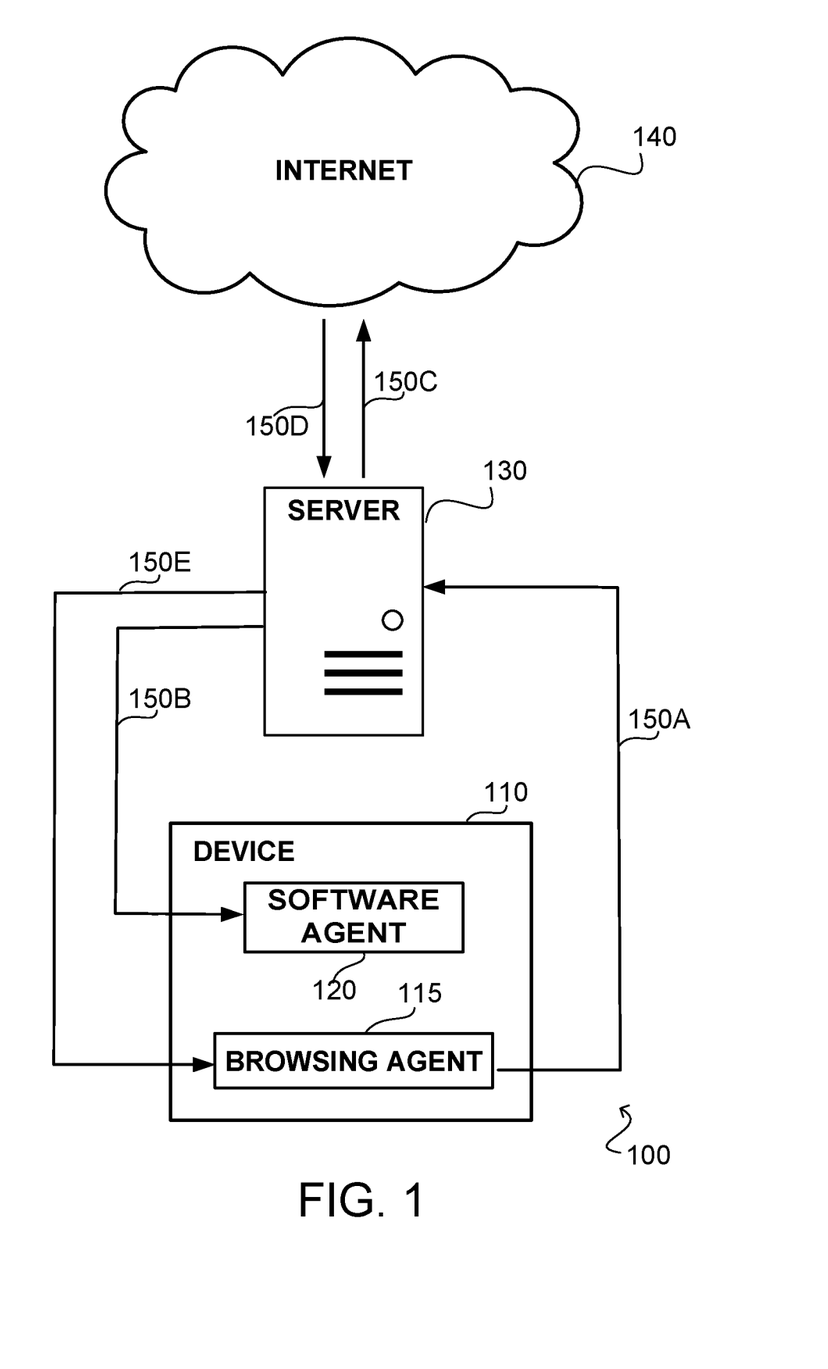
FIG. 1 shows a schematic illustration of an exemplary environment and architecture in which the disclosed subject matter may be utilized, in accordance with some exemplary embodiments of the disclosed subject matter.

Referring now to FIG. 1 showing an illustration of a computerized environment, in accordance with some exemplary embodiments of the disclosed subject matter.

In some exemplary embodiments, Environment 100 may comprise a Device 110. Device 110 may be a smartphone, a smartwatch, a tablet, a Personal Computer (PC) or the like. Device 110 may comprise an OS, a processor, a receiver, a transmitter, a memory, a network interface, or the like. Device 110 may be used by a human user that may install applications on Device 110 to search the web, read data, consume content, play games, or the like.

Device 110 may comprise a software product such as a Browsing Agent 115. Browsing Agent 115 may be configured to access URLs via a computerized network, such as Internet 140. In some exemplary embodiments, Browsing Agent 115 may be an Internet browser, a web-based mobile application, a Hypertext Transfer Protocol (HTTP) stack of the OS, or the like. In some exemplary embodiments, Browsing Agent 115 may utilize wireless or wired access to Internet 140. Device 110 may be connected to a network, for example, through a Bluetooth™ connection, a WiFi™ connection, a local cellular connection, a Local Area Network (LAN), a Wide Area Network (WAN), or the like.

Software Agent 120 may be a software installed on Device 110 that is configured to monitor activity of the user, such as browsing activity thereof. Software Agent 120 may be implemented as a Software Development Kit (SDK) and may be installed as an integral part of another application, as an independent application, or the like. In some exemplary embodiments, Software Agent 120 may be independent from Browsing Agent 115 and may be stored on Device 110, stored on a hard drive while being accessible through Device 110, or the like. In some exemplary embodiments, instead of Software Agent 120 being installed on Device 110, a software component may be installed on a remote cloud server. In such a case, the software component may obtain a unique identifier of the user of Device 110 (or an identifier of Device 110 itself) and URLs to which the user is browsing to. The software component may profile the user as if software component is installed on the Device 110.

In some exemplary embodiments, Software Agent 120 may be configured to monitor the activity of the user for profiling purposes. Software Agent 120 may obtain data about the user of Device 110 to create a profile of the user based on the data. In some cases, the data may include web sites which the user is browsing, e.g., which may be valuable when profiling a user. As an example, the user may be searching for a flight and may use a web browser in order to find a preferred flight. It may be useful to know what destinations are of interest to the user in order to display relevant ads to the user. Additionally or alternatively, the user may be using a web application such as the New York Times™, and it may be useful to know which articles the user is interested in. As an example, the user may be interested in articles about sports. Such data may be utilized to provide the user with relevant ads regarding sports equipment, to provide the user with ads regarding tickets to sport events, to personalize a display of a web-based application to include more sports content, or the like.

In some exemplary embodiments, Browsing Agent 115 may not be configured to cooperate with Software Agent 120, and vice versa. For example, Browsing Agent 115 may monitor browsing activity on its own, e.g., independently, but may not share such information with Software Agent 120. In some cases, Browsing Agent 115 may be executed by the user device to issue web resource requests, for example, without notifying, communicating, or taking into account Software Agent 120.

In some exemplary embodiments, Environment 100 may comprise a Server 130. a Server 130 may be a DNS, a GW server, a VPN server, or the like. In some cases, a GW server of the ISP may be configured to connect Device 110 with Internet 140. The GW server may be configured to route a resource request aimed at a URL, fetch the requested resource and return the requested resource to Device 110. For example, if Server 130 is a GW server, Server 130 may be configured to route web page requests from Device 110 to Internet 140, and to route corresponding web pages received from Internet 140 to Device 110. Upon obtaining a request from Device 110, Server 130 may be configured to send an indication of the request back to Device 110 in a port upon which Software Agent 120 is listening. In other cases, Server 130 may return back to Device 110 the domain name of the URL, the URL itself, a portion of the URL, or the like. In other cases, if Server 130 is a DNS server, Server 130 may be configured to resolve the domain name of the requested URL and return an IP address thereof back to Device 110. Additionally, Server 130 may be configured to send an indication of the request that may or may not include the IP address back to Device 110 in a port upon which Software Agent 120 is listening.

Figure 2:
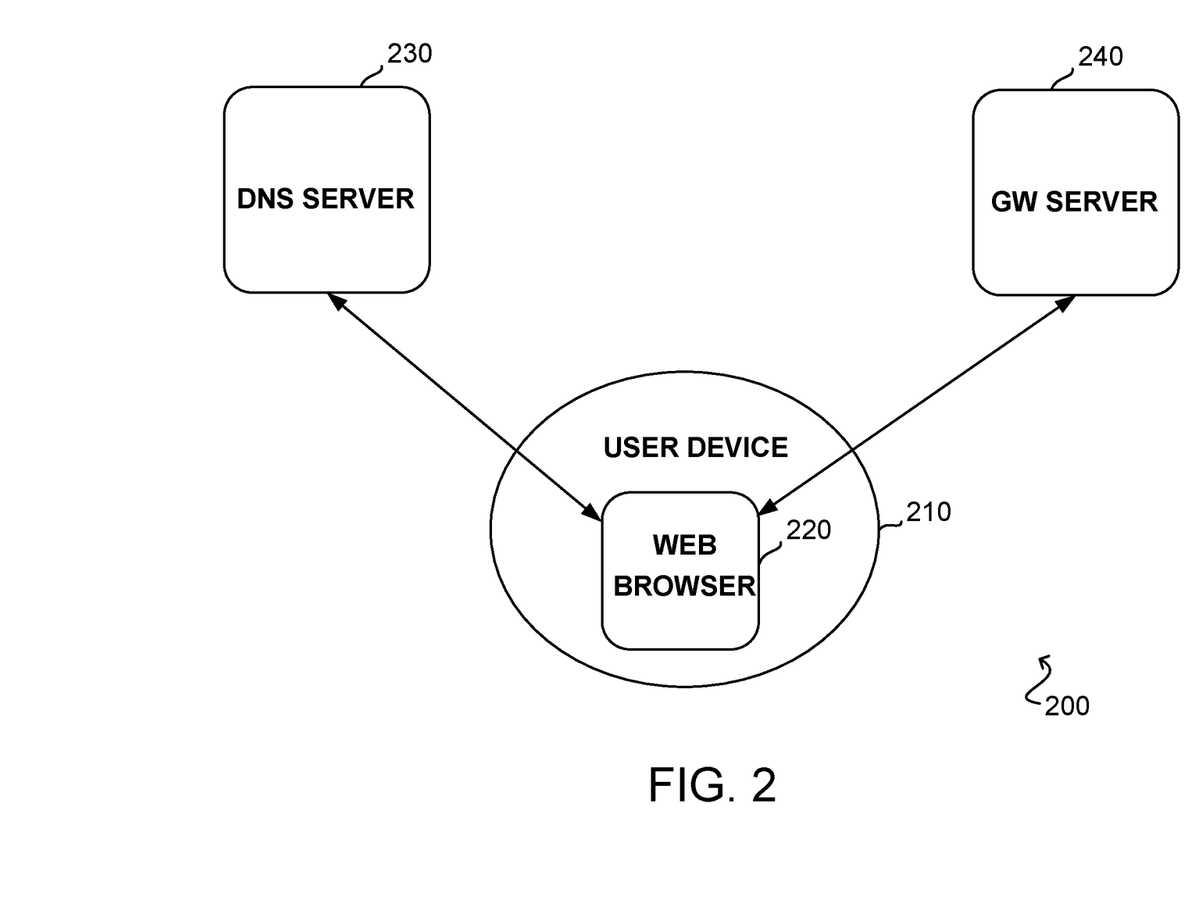
FIG. 2 shows a schematic illustration of an exemplary environment and architecture for communicating with a server in which the disclosed subject matter may be utilized, in accordance with some exemplary embodiments of the disclosed subject matter.

Referring now to FIG. 2 showing an illustration of a computerized environment for communicating with a server, in accordance with some exemplary embodiments of the disclosed subject matter.

In some exemplary embodiments, Environment 200 may comprise a User Device 210 that may correspond to Device 110 (FIG. 1), and a Web Browser 220 that may correspond to Browsing Agent 115 (FIG. 1). In some exemplary embodiments, Web Browser 220 may be configured to access URLs via a computerized network, such as the Internet.

In some exemplary embodiments, when the user wishes to browse a particular website, Web Browser 220 may retrieve the necessary content from a web server such as Gateway Server 240. The resulting web page may be displayed on the User Device 210, e.g., on Web Browser 220 within User Device 210. In some exemplary embodiments, the user may input a URL such as "duckduckgo.com/" (with or without an "http://" or "https://" prefix, which is omitted from hereon), into Web Browser 220. In some exemplary embodiments, a request for the URL "duckduckgo.com/" may be forwarded to a DNS Server 230, which may be configured to translate or convert the URL to an IP address such as 107.20.240.232. In some exemplary embodiments, the IP address may be returned from DNS Server 230 to Web Browser 220, and Web Browser 220 may forward the IP address to Gateway Server 240. Gateway Server 240 may retrieve the relevant web page, and send it to Web Browser 220. In some exemplary embodiments, once a web page has been retrieved, Web Browser 220's rendering engine may display the web page on a display of User Device 210.

In some exemplary embodiments, DNS Server 230 or Gateway Server 240 may be configured to echo back to Device 110 an indication of any received URL request. For example, a request for the URL "duckduckgo.com/?q=duck&t=hk&ia=web" may be partially or fully returned from DNS Server 230 or Gateway Server 240 to User Device 210. In some cases, DNS Server 230 or Gateway Server 240 may return the full URL or a portion thereof, such as the domain name "duckduckgo.com", the query portion "duck", or the like. In some cases, only one of DNS Server 230 and Gateway Server 240 may be configured to echo back requests, e.g., to avoid accumulating duplicated information.

Referring back to FIG. 1, Software Agent 120 may signal to Server 130 that URL requests are to be echoed back. In other cases, Server 130 may be preconfigured to return URL requests to Device 110, or Server 130 may obtain a whitelist including one or more devices for which URL requests are to be returned. In other cases, any other mechanism may be used to differentiate between devices that have an installed Software Agent 120, to which URL requests are to be echoed back, and between devices that do not have an installed Software Agent 120, to which URL requests should not be echoed back. Additionally or alternatively, Server 130 may attempt echoing back information and in absence of an acknowledgement of receipt may determine to stop sending indications to the unresponsive device.

In some exemplary embodiments, Software Agent 120 may be configured to monitor at least one predetermined port of Device 110, e.g., to detect any echoed URL requests. In some exemplary embodiments, Software Agent 120 may be configured to accumulate returned URL requests for creating a personalized profile of the user of Device 110, for example, based at least on the user's browsing history.

In some exemplary embodiments, Software Agent 120 may analyze the content of the request to further profile the user. Software Agent 120 may be capable of monitoring web browsing activity and other HTTP-based activity of Device 110 without the cooperation of Browsing Agent 115. In addition, the profiling may be performed on-device, e.g., to preserve a privacy of the user, and avoid creating a centralized database of personal information of users retained by the owner of the profiling party.

As illustrated in FIG. 1, Device 110 may issue a Communication 150A to Server 130, such as a request to obtain a web resource based on a URL. Communication 150A may be issued by Browsing Agent 115 and communicated to Server 130. In some cases, Server 130 may echo Communication 150A, content associated therewith, or the like, to Device 110 using a Communication 150B. Communication 150B may be received by Software Agent 120. Server 130 may also handle the request of Communication 150A, such as by routing the request to the Internet (150C) and receiving from a target server (e.g., a web server that the URL is pointing to) the requested web resource (150D). The response (150E) may be routed to Device 110, where it may be handled by Browsing Agent 115 who issued the request initially.

In some cases, Communication 150B may be delayed until Communication 150D is received by Server 130, and Communication 150B may also include some properties obtained from Communication 150D, such as the web resource itself. In other cases, Communication 150B may not be delayed, e.g., regardless of a status of Communication 150D or any other Communication. For example, Communication 150B may not include any properties obtained from Communication 150D when transmitted from Server 130 prior to receiving Communication 150D. At such cases, Communication 150B may include properties obtained based on Communication 150A.

In some exemplary embodiments, Communications 150B and 150E may be transmitted to the same device, Device 110, but may be directed to different ports: Communication 150B may be directed to the port on which Software Agent 120 is listening, while Communication 150E may be directed to the port on which Browsing Agent 115 (or a component on its behalf) is listening.

Figure 3:
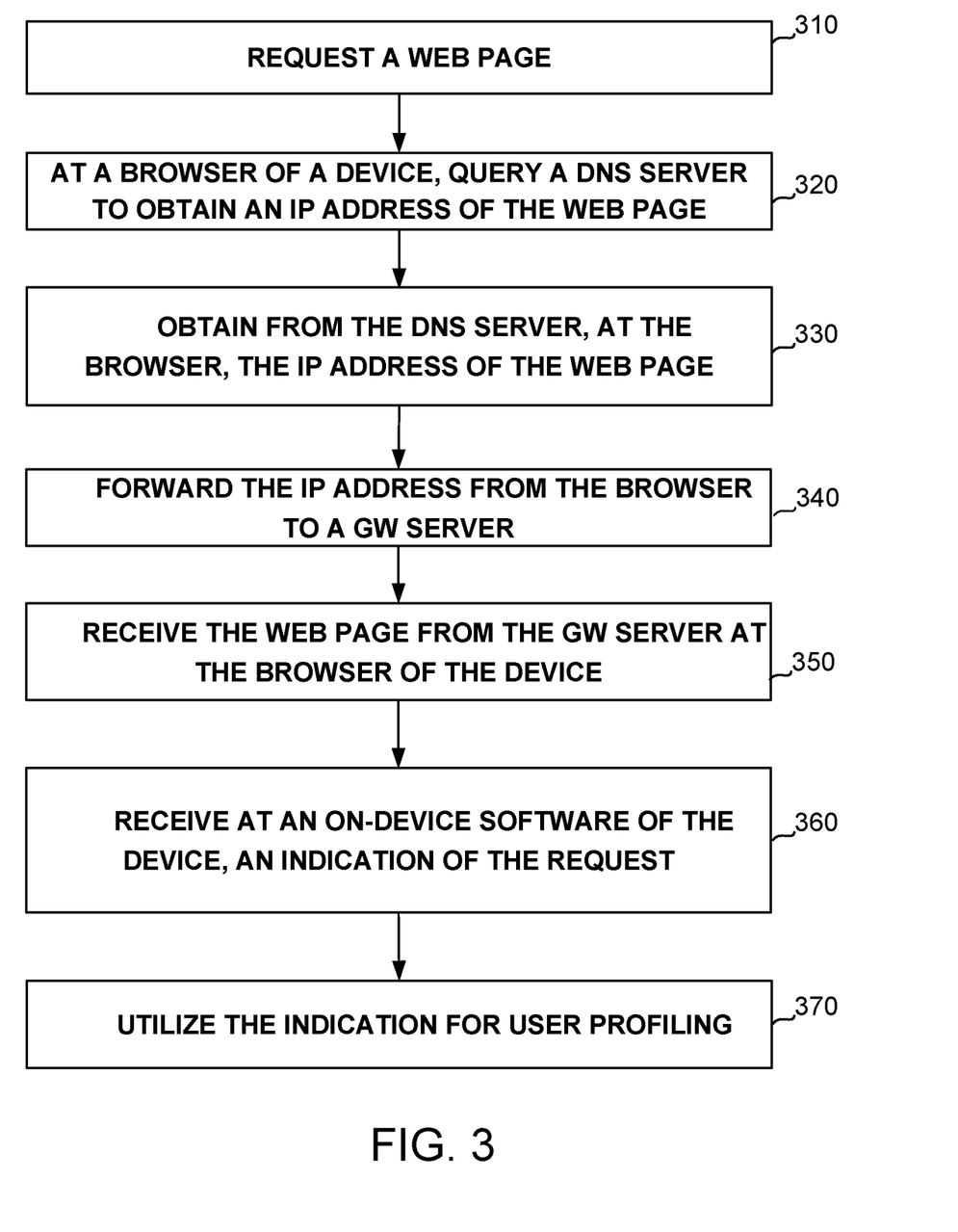
FIG. 3 shows a flowchart diagram of a method, in accordance with some exemplary embodiments of the disclosed subject matter.

Referring now to FIG. 3 showing a flowchart diagram of a method to be implemented at a user device, in accordance with some exemplary embodiments of the disclosed subject matter.

On Step 310, a user may request a web resource such as a web page. The user may be using a web browser, which may issue a request for the web page. Additionally or alternatively, the user may be using a web application, which may issue the request. In some cases, the web application may be a native application that allows to navigate thorough web pages of a specific site such as eBay™, The New York Times™, or the like. For illustration purposes, consider that the URL requested is "www.uspto.gov/a/b/c", with the domain name being "uspto.gov".

On Step 320, in order to fetch the requested web page, the web browser of the user device may query a DNS server for the IP address of a web server hosting the web page. In some cases, the HTTP(s) stack in the device may query the DNS server. The query may comprise a URL, a domain name, or the like. For the purpose of simplicity and clarity, but without loss of generality, the description of the method relates mostly to web browsers. However, it is noted that any description relating to a web browser may be interchangeable with a description relating to any other web-based application.

On Step 330, in response to the query, the DNS server may provide the requested IP address to the user device. In some exemplary embodiments, the web browser of the user device may obtain the IP address of the web server from the DNS server. In some cases, the IP address may be obtained by the device's OS. Referring to the example above, the domain name "uspto.gov" may be provided to the DNS which may resolve the domain name to an IP address, such as "217.12.90.4". In some exemplary embodiments, the IP address may be provided to allow the OS or browsing agent to fetch the web page at the web server, by a subsequent request aimed at the IP address and requesting the web page resource within the web server.

On Step 340, the user device may forward the IP address to a gateway server, such as the gateway server of the ISP, a VPN's server, or the like. In some cases, once the user device has obtained the IP address of the requested web page from the DNS, the HTTP(s) stack or the browsing agent may request for the web page. The gateway server may receive a URL request and be tasked in obtaining the web resource of the URL. The gateway server may contact the web server referred to in the URL (either indicated by name or by an IP address), and request to retrieve the web resource (e.g., web page) at a designated location indicated by the URL.

On Step 350, the requested web page may be routed through the gateway server of the ISP, and provided to the web browser of the user device.

On Step 360, either the DNS or the gateway server may send an indication of the request it originally received (with or without the content of the response thereto) to a predetermined port of the user device. In some exemplary embodiments, in case the DNS in configured to echo requests, the DNS may send an indication of the query with or without the resolved IP address back to the user device. In some cases, the DNS may send the content of the query (e.g., "uspto.gov") to be received by an on-device software that is not participating in the process of fetching the web resource using the URL. In some exemplary embodiments, in case the gateway server in configured to echo requests, the gateway server may send an indication of the request such as the target IP address, the web page properties such as a domain name or a content of the web page, or the like. In some exemplary embodiments, the on-device software may be a profiling software that is on the device. It is noted that Step 360 may be performed before Step 330, in case the DNS sends the indication, or before Step 350, if the GW Server sends the indication.

On Step 370, The on-device software may obtain indications of requested URLs and utilize them for its purposes, such as for profiling purposes. It is noted that the on-device software, although running on the user device, may not be part of the web page obtaining process, and may not have a component that is part of such a process. The on-device software may be unaware to the application that initiates the query to the DNS. Additionally or alternatively, the on-device software may be running on a remote cloud server and may not be an on-device software.

Figure 4:
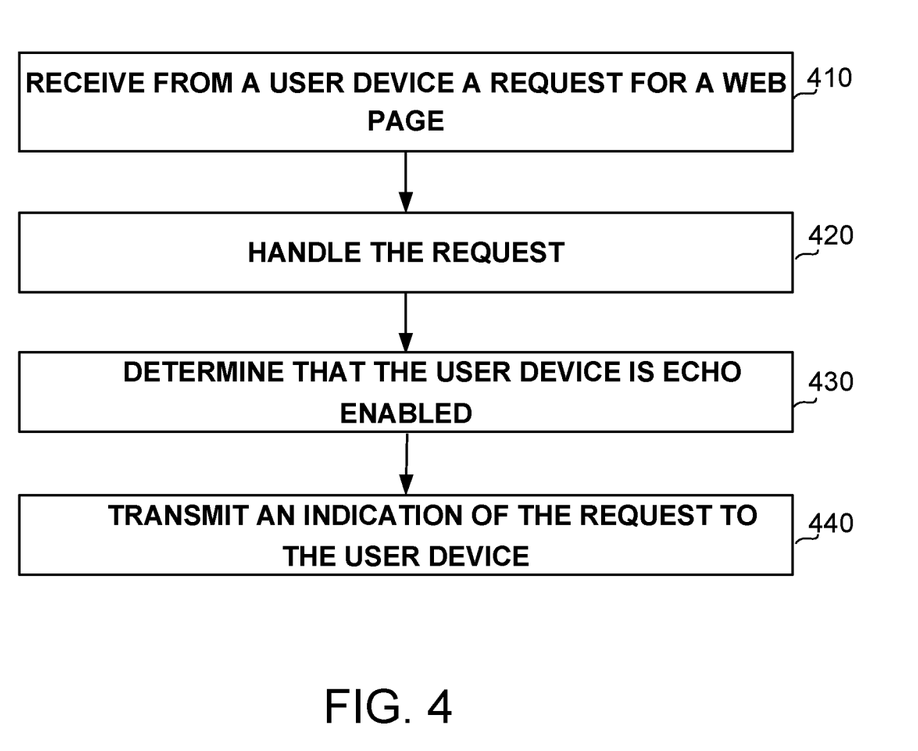
FIG. 4 shows a flowchart diagram of a method, in accordance with some exemplary embodiments of the disclosed subject matter.

Referring now to FIG. 4 showing a flowchart diagram of a method to be implemented at a server, in accordance with some exemplary embodiments of the disclosed subject matter.

On Step 410, a server, such as a DNS server or a gateway server, may receive from a user device a request for a web resource such as a web page. In some exemplary embodiments, a DNS server may receive a URL request or a request to resolve a domain name from a user device, and a gateway server may receive an IP address associated with the URL request. In some exemplary embodiments, the server may receive a plurality of requests from a plurality of devices.

On Step 420, the server may handle the request. In some exemplary embodiments, handling the request may comprise a DNS server resolving an IP address of a web server hosting the web page and forward the IP address to a requesting software of the user device, e.g., a browsing agent. In some exemplary embodiments, handling the request may comprise fetching the requested web page. In some exemplary embodiments, a gateway server may fetch the requested web page by receiving an IP address of a required web page from the user device and forwarding the IP address to a corresponding web server. The gateway server may contact the web server referred to in the IP address, and request to retrieve the web resource (e.g., web page) at a designated location indicated by the request. In some exemplary embodiments, upon fetching the requested web page, the gateway server may provide the web page to the requesting software of the user device, e.g., the browsing agent.

On Step 430, the server may determine whether or not the user device is echo-enabled. In some cases, the server may retain a list of echo-enabled devices, and may utilize the list to determine for each device of the plurality of devices whether or not the device is echo-enabled. Additionally or alternatively, the server may receive from some of the plurality of devices a signal indicating whether or not the device is echo-enabled. In some cases, the signal may be integrated with the request for the web resource. In other cases, the signal may be an independent signal such as an IP packet, a Transmission Control Protocol (TCP) packet, a sounding signal such as a Null Data Packet, a power signal, or the like.

On Step 440, the server may send an indication of the request it originally received (with or without the content of the response thereto) to a predetermined port of the user device.

Figure 5:
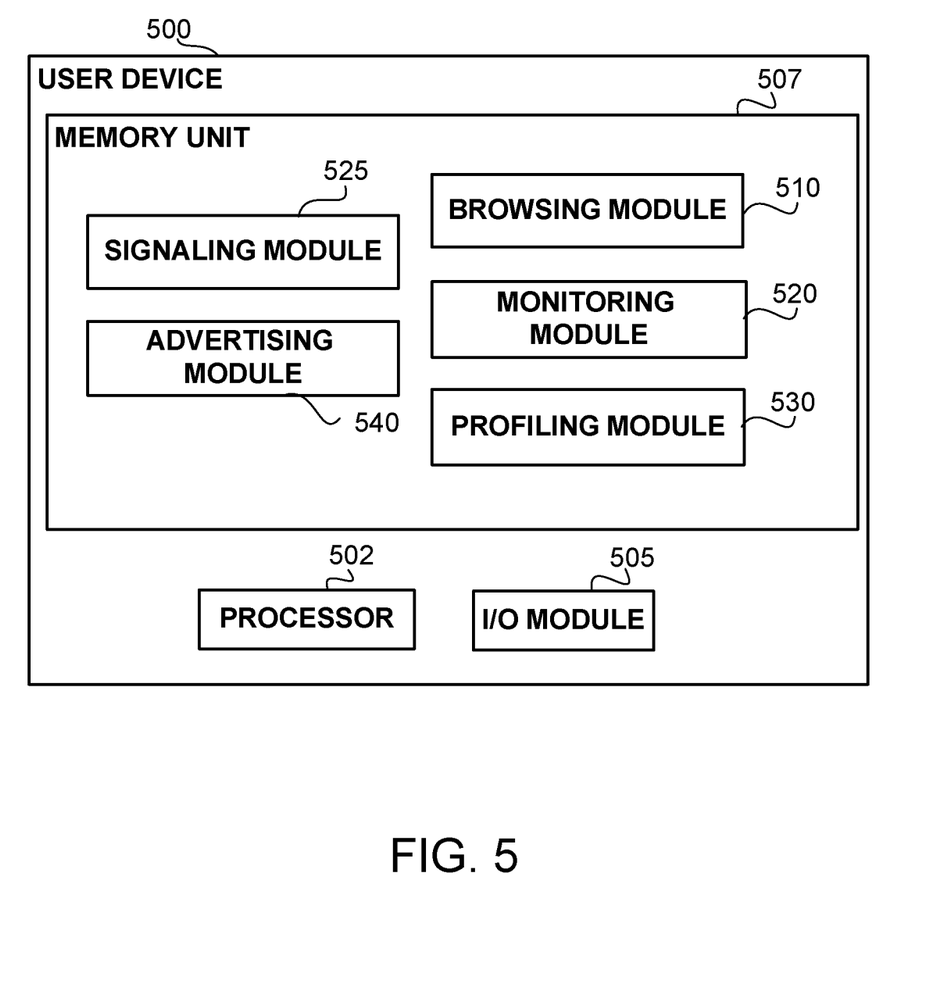
FIG. 5 shows a block diagram of an apparatus, in accordance with some exemplary embodiments of the disclosed subject matter.

Referring now to FIG. 5 showing a block diagram of components of a user device, in accordance with some exemplary embodiments of the disclosed subject matter.

In some exemplary embodiments, a User Device 500 may comprise a Processor 502. Processor 502 may be a Central Processing Unit (CPU), a microprocessor, an electronic circuit, an Integrated Circuit (IC) or the like. Processor 502 may be utilized to perform computations required by User Device 500 or any of its subcomponents. Processor 502 may be configured to execute computer-programs useful in performing the method of FIGS. 3, 4, or the like.

In some exemplary embodiments of the disclosed subject matter, an Input/Output (I/O) Module 505 may be utilized to provide an output to and receive input from a user. I/O Module 505 may be operatively coupled to a touch screen, a mouse, a keyboard or a similar device which may be used for receive input from the user. I/O Module 505 may be operatively coupled to a display (not shown), speaker (not shown) or a similar device which may be used for providing feedback or reports to the user. I/O Module 505 may further be used to transmit and receive information to and from the user or any other apparatus in communication therewith.

In some exemplary embodiments, User Device 500 may comprise a Memory Unit 507. Memory Unit 507 may be a short-term storage device or long-term storage device. Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 502 to perform acts associated with any of the subcomponents of User Device 500. In some exemplary embodiments, Memory Unit 507 may retain program code operative to cause Processor 502 to perform acts associated with any of the steps in FIGS. 3, 4, or the like.

The components detailed below may be implemented as one or more sets of interrelated computer instructions, executed for example by Processor 502 or by another processor. The components may be arranged as one or more executable files, dynamic libraries, static libraries, methods, functions, services, or the like, programmed in any programming language and under any computing environment.

In some exemplary embodiments, Browsing Module 510 may be configured to transmit a request associated with obtaining a web page, e.g., via I/O Module 505 or via any other component or device. In some cases, the request may be generated in response to a user action indicating that an access to the web page is requested. For example, a user may browse the web using Browsing Module 510 and press on a link to a certain website. Accordingly, Browsing Module 510 may generate and transmit a request for obtaining the certain website. Browsing Module 510 may request the web page from a server such as a gateway server or a DNS server. In some cases, the web page may be provided to Browsing Module 510 by the server. In some exemplary embodiments, an indication of the request may be echoed to the user device by the server.

In some exemplary embodiments, Monitoring Module 520 may be configured to continuously monitor a predetermined port of the user device to detect at the predetermined port an indication of a request associated with obtaining a web page. Monitoring Module 520 may be configured to perform the continuous monitoring upon direct or indirect activation of a software application by user, as a background process, or the like. In some cases, in addition to Browsing Module 510, a plurality of browsing agents, web-based applications, or the like, may request web resources from the server, e.g., in parallel, sequentially, or a combination thereof. For example, a user may activate or enable background operations by more than one mobile application at the same time. Monitoring Module 520 may be configured to monitor indications from all the software components, from some of the software components, or the like.

In some exemplary embodiments, Monitoring Module 520 may be configured to operate independently from Browsing Module 510, e.g., without communicating, sharing, obtaining information, or being aware to Browsing Module 510. In some exemplary embodiments, Monitoring Module 520 may not be notified of requests sent by Browsing Module 510 to the server.

In some exemplary embodiments, Signaling Module 525 may be configured to send a signal such as a heartbeat signal to the server, e.g., to notify the server that indications of requests associated with obtaining a web page are requested to be sent back to the user device. In some cases, the server may or may not acknowledge such signals, e.g., according to a determined configuration. Monitoring Module 520 may be enabled to monitor the indications of the requests, e.g., after providing the signal by Signaling Module 525. In other cases, the server may retain a list of echo-enabled devices, and thus the signal may not be required. In some cases, the signal may comprise a request to amend the retained list of the server, for example, to add or remove a device therefrom.

In some exemplary embodiments, Profiling Module 530 may be configured to accumulate echoed requests, e.g., from Monitoring Module 520, and to generate a personalized profile of the user of the user device based at least on the browsing history of the user. In some cases, Profiling Module 530 may generate the personalized profile of the user based on any other parameters, user information, or the like.

In some exemplary embodiments, Advertising Module 540 may be configured to serve relevant ads to the user based on the personalized profile of the user, e.g., provided by Profiling Module 530. For example, Advertising Module 540 may obtain the personalized profile of the user and analyze the profile to determine one or more ads that are to be provided to the user in one or more websites or web-based applications associated with an advertising party. In some cases, Advertising Module 540 may be associated with one or more advertising parties that have access to one or more advertising platforms. In some cases, besides having access to the personalized profile of the user, Advertising Module 540 may not have access to the accumulated echoed requests of the user that were accumulated by Profiling Module 530. Accordingly, a privacy of the user may be kept.

Additionally or alternatively, Advertising Module 540 may merely provide the personalized profile of the user to third party servers or devices, which may determine and provide relevant ads to the user.

Figure 6:
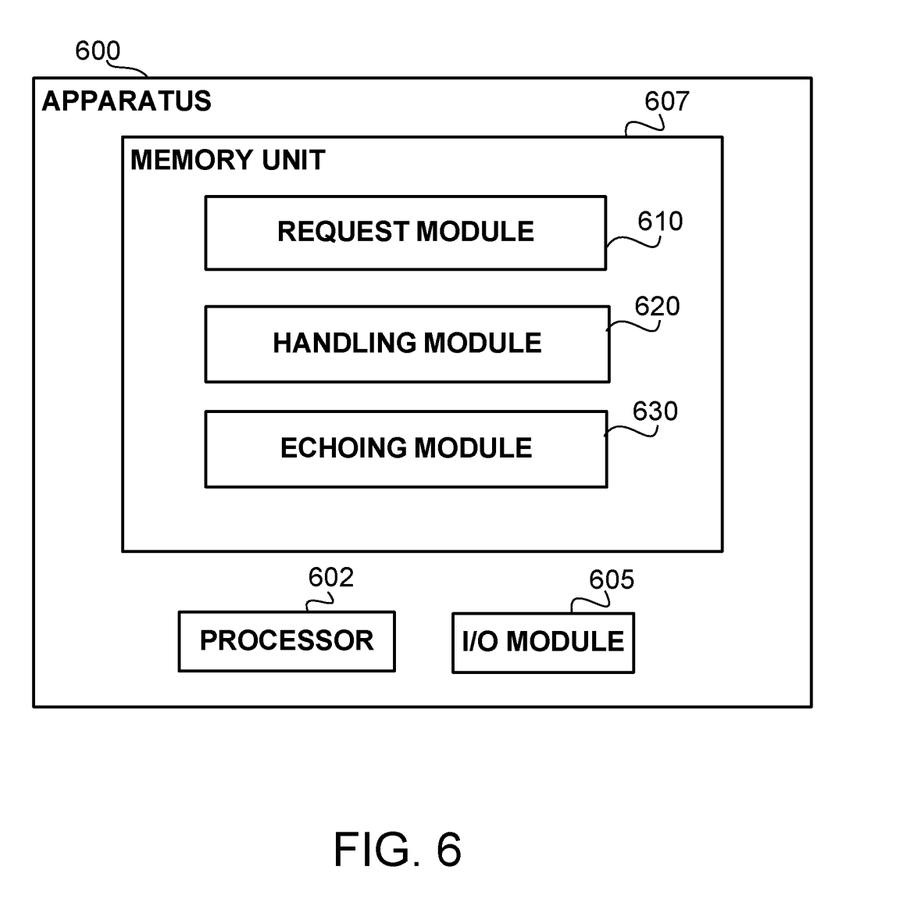
FIG. 6 shows a block diagram of components of an apparatus of a server, in accordance with some exemplary embodiments of the disclosed subject matter.

Referring now to FIG. 6 showing a block diagram of components of an apparatus of a server, in accordance with some exemplary embodiments of the disclosed subject matter.

In some exemplary embodiments, an Apparatus 600 may comprise a Processor 602. Processor 602 may be a Central Processing Unit (CPU), a microprocessor, an electronic circuit, an Integrated Circuit (IC) or the like. Processor 602 may be utilized to perform computations required by Apparatus 600 or any of its subcomponents. Processor 602 may be configured to execute computer-programs useful in performing the method of FIGS. 3, 4, or the like.

In some exemplary embodiments of the disclosed subject matter, an Input/Output (I/O) Module 605 may be utilized to provide an output to and receive input from a user. I/O Module 605 may be used to transmit and receive information to and from the user or any other apparatus in communication therewith.

In some exemplary embodiments, Apparatus 600 may comprise a Memory Unit 607. Memory Unit 607 may be a short-term storage device or long-term storage device. Memory Unit 607 may be a persistent storage or volatile storage. Memory Unit 607 may be a disk drive, a Flash disk, a Random Access Memory (RAM), a memory chip, or the like. In some exemplary embodiments, Memory Unit 607 may retain program code operative to cause Processor 602 to perform acts associated with any of the subcomponents of Apparatus 600. In some exemplary embodiments, Memory Unit 607 may retain program code operative to cause Processor 602 to perform acts associated with any of the steps in FIGS. 3, 4, or the like.

The components detailed below may be implemented as one or more sets of interrelated computer instructions, executed for example by Processor 602 or by another processor. The components may be arranged as one or more executable files, dynamic libraries, static libraries, methods, functions, services, or the like, programmed in any programming language and under any computing environment.

In some exemplary embodiments, Requests Module 610 may be configured to receive one or more requests associated with obtaining respective web pages, e.g., via I/O Module 605 or via any other component or device. Requests Module 610 may be configured to continuously monitor ports of the server to detect any communications with devices.

In some exemplary embodiments, Handling Module 620 may be configured to handle any received request for a web page. In some cases, when the server is a gateway server, Handling Module 620 may forward any received request for a web page to a network node that corresponds to the request, e.g., based on its IP address, and upon receiving the web page from the network, Handling Module 620 may provide the web page to the requesting device. In other cases, when the server is a DNS server, Handling Module 620 may convert a domain name of the received request to an IP address, and provide the IP address to the requesting device.

In some exemplary embodiments, Echoing Module 630 may be configured to determine whether or not a received request originated from an echo-enabled device. For example, upon receiving a signal indicating that a received request originated from an echo-enabled device, Echoing Module 630 may add the echo-enabled device to a list of echo-enabled devices. In some cases, upon determining that a received request did originate from an echo-enabled device, Echoing Module 630 may echo or return an indication of the received request to a predetermined port of the echo-enabled device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to be performed at a server, the method comprising:
   receiving from a user device a request, wherein the request is associated with obtaining a web resource;
   handling the request, wherein, based on said handling, the web resource is obtained;
   transmitting the web resource to a first port of the user device, whereby responding to the request; and
   transmitting an indication of the request to a second port of the user device, wherein the second port is a predetermined port, wherein the first port is different than the second port.

2. The method of claim 1 comprising determining whether or not the user device is configured to receive the indication, and upon determining that the user device is configured to receive the indication, performing said transmitting the indication.

3. The method of claim 1 further comprising:
   receiving from the user device a signal indicating that the user device is configured to receive the indication; and
   in response to the signal, performing said transmitting the indication.

4. The method of claim 3 comprising avoiding from transmitting the indication in an absence of receiving the signal within a timeframe.

5. The method of claim 1, wherein the request comprises a Uniform Resource Locator (URL), and the indication comprises at least one of the group consisting of: the URL, an Internet Protocol (IP) address of the URL, a domain name within the URL, and a query portion within the URL.

6. The method of claim 1, wherein the request comprises a Uniform Resource Locator (URL), the method further comprising analyzing the URL to determine a domain name within the URL, wherein the indication comprising the domain name.

7. The method of claim 1, wherein the request comprises a Uniform Resource Locator (URL), the method further comprising analyzing the URL to determine a query portion within the URL, wherein the indication comprising the query portion.

8. The method of claim 1, wherein the request is issued by a browser that is executed on the user device, wherein the user device executing a software agent listening on the predetermined port, wherein the software agent is independent of the browser.

9. The method of claim 1, wherein the server comprises a gateway server, wherein the request comprises an Internet Protocol (IP) address, wherein said handling comprises forwarding the IP address to a network node to obtain a web page associated with the IP address.

10. The method of claim 1, wherein the server comprises a Domain Name Server (DNS), wherein the request comprises a domain name, wherein said handling comprises querying a database to obtain an Internet Protocol (IP) address of a web server associated with the domain name, and said transmitting the web resources comprises providing the IP address to the first port of the user device, thereby enabling the user device to communicate with the web server.

11. A system at a server, the system comprising a processor and coupled memory, the processor being adapted to perform:
    receiving from a user device a request, wherein the request is associated with obtaining a web resource;
    handling the request, wherein, based on said handling, the web resource is obtained:
    transmitting the web resource to a first port of the user device, whereby responding to the request; and
    transmitting an indication of the request to a second port of the user device wherein the second port is a predetermined port, wherein the first port is different than the second port.

12. The system of claim 11, wherein the processor is adapted to determine whether or not the user device is configured to receive the indication, and upon determining that the user device is configured to receive the indication, performing said transmitting the indication.

13. The system of claim 11, wherein the request comprises a Uniform Resource Locator (URL), and the indication comprises at least one of the group consisting of: the URL, an Internet Protocol (IP) address of the URL, a domain name within the URL, and a query portion within the URL.

14. A method to be performed at a user device, the method comprising:
- transmitting to a server, from a software product that is executed by the user device, a plurality of requests of web resources;
- receiving from the server, by a software agent that is executed by the user device, a plurality of indications of the plurality of requests of web resources via a predetermined port of the user device, wherein the software product is not configured to provide information to the software agent;
- performing, by the software agent, an analysis of the plurality of requests of web resources indicated, thereby determining for a user of the user device one or more user parameters associated with a personalized profile of the user; and
- performing an action based on the personalized profile of the user.

15. The method of claim 14, wherein the action comprises selecting content items to be served to the user based on the personalized profile of the user.

16. The method of claim 14, wherein the software agent is configured to send a signal to the server, whereby indicating to the server to send the plurality of indications to the user device via the predetermined port.

17. The method of claim 16, wherein the server is configured to avoid transmitting the plurality of indications in an absence of receiving the signal within a timeframe.

18. The method of claim 14, wherein the software agent is configured to monitor the predetermined port, wherein the software agent is independent of the software product.

19. The method of claim 14, wherein the software product comprises a browsing agent or a web-based application, wherein the software agent is independent of the browsing agent or the web-based application.

20. A computer program product comprising a non-transitory computer readable storage medium retaining program instructions, which program instructions when read by a processor, cause the processor to perform at a user device:
- transmitting to a server, from a software product that is executed by the user device, a plurality of requests of web resources;
- receiving from the server, by a software agent that is executed by the user device, a plurality of indications of the plurality of requests of web resources via a predetermined port of the user device, wherein the software product is not configured to provide information to the software agent;
- performing, by the software agent, an analysis of the plurality of requests of web resources indicated, thereby determining for a user of the user device one or more user parameters associated with a personalized profile of the user; and
- performing an action based on the personalized profile of the user.

* * * * *